(No Model.)
W. S. ROLSTON.
ICE CREAM FREEZER.
No. 507,329. Patented Oct. 24, 1893.
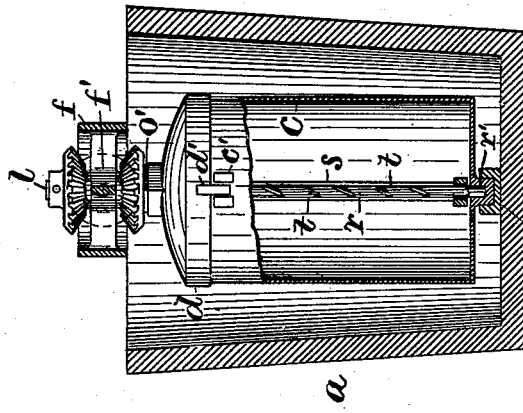
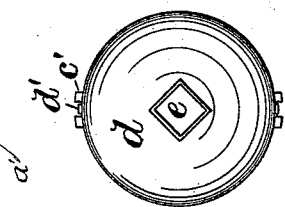
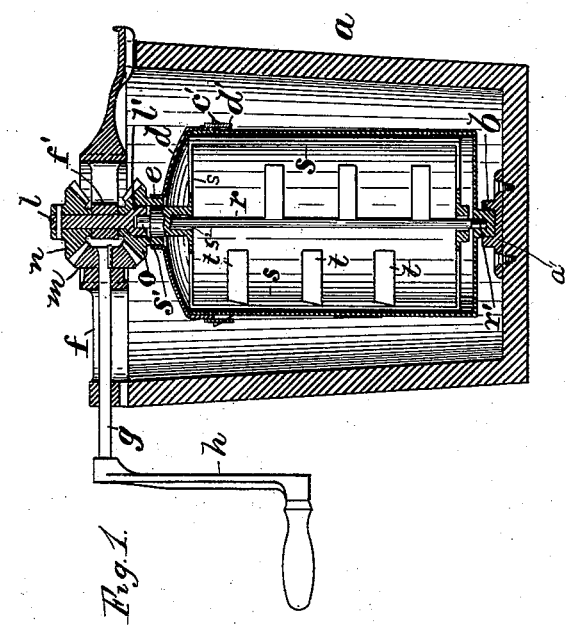
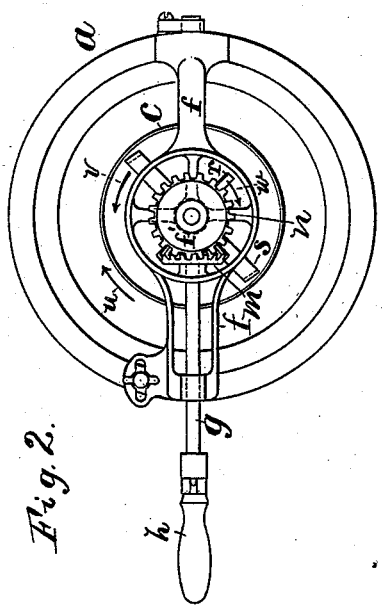
Attest.
Inventor.
William S. Rolston

UNITED STATES PATENT OFFICE.

WILLIAM S. ROLSTON, OF ELIZABETH, NEW JERSEY.

ICE-CREAM FREEZER.

SPECIFICATION forming part of Letters Patent No. 507,329, dated October 24, 1893.

Application filed July 3, 1893. Serial No. 479,445. (No model.)

*To all whom it may concern:*

Be it known that I, WILLIAM S. ROLSTON, a citizen of the United States, residing at Elizabeth, Union county, New Jersey, have invented certain new and useful Improvements in Ice-Cream Freezers, fully described and represented in the following specification and the accompanying drawings, forming a part of the same.

This invention relates to an improvement in an existing so-called "triple-motion" ice-cream freezer; and it consists in the specific construction herein shown, described, and claimed.

In the annexed drawings, Figure 1 is a sectional elevation of the apparatus. Fig. 2 is a plan of the same with the top of the freezing cylinder removed to expose the scraper and agitator. Fig. 3 is an elevation, partly in section where hatched, viewed from the right of Fig. 1. Fig. 4 is a plan of the freezing cylinder and its cover; and Fig. 5 is a view of the under side of the lower member of the driving mechanism and its spindle.

The ice receptacle $a$ is provided upon the bottom with a bearing $a'$ to which is fitted the journal $b$ upon the bottom of the freezing cylinder $c$, in the usual manner. The cover $d$ of the freezing cylinder is provided with a square central socket $e$ having tongues $d'$ upon its periphery overhanging the lower edge to engage lugs $c'$ upon the periphery of the cylinder for locking the cylinder and cover together from independent rotation.

The scraper $s$ is rectangular in shape and provided upon one side with inwardly projecting vanes $t$ and upon the upper end with the square head $s'$ and with a round socket $s^2$ concentric therewith. The central agitator is provided with a spindle $r$ cylindrical at the top to fit the socket in the upper side of the scraper but its lower end $r'$ being squared to engage a socket of similar shape in the bottom of the cylinder. The lower side of the rectangular scraper is perforated, as indicated in Figs. 1 and 3, for the insertion of the agitator spindle $r$.

The driving mechanism consists in a crank shaft $g$ mounted in the removable frame $f$ secured upon the receptacle $a$ and is provided at its outer end with the crank $h$ and at the inner end with the bevel gear $m$. The frame $f$ is provided with the bearing $f'$ concentric with the freezing cylinder, and in such bearing is mounted the spindle $l$ carrying at its upper end the fixed bevel gear $n$ and at the lower end the loose bevel gear $o$, both of such gears meshing with the gear $m$. The spindle $l$ is provided at its lower end with an enlargement $l'$, fitted within the gear $o$ to sustain the latter in place, and with a square socket $l^2$ therein fitted to the head $s'$ upon the scraper $s$. The gear $o$ is formed with a square boss $o'$ adapted to fit within the socket $e$ in the cover $d$.

By turning the crank $h$ to the right, the revoluble parts of the apparatus are made to move in the directions indicated by the arrows in Fig. 2. The arrow $u$ shows the direction of the freezing cylinder, which is actuated from the gear $o$ by means of the cover $d$ engaging such gear; the arrow $v$ indicates the direction of rotation of the scraper $s$, which is connected with the gear $n$ by means of the spindle $l$ in engagement with the square head $s'$; and the arrow $w$ shows the direction of movement of the agitator whose stem is squared to fit a socket in the bottom of the freezing cylinder with which it is made to rotate.

It will be observed from the above description that the distinguishing feature of my invention is the means of detachably coupling together the freezing cylinder cover and its driving gear; consisting of an angular boss upon one of such members fitted to a socket upon the other member.

Heretofore it has been proposed to cast the freezer cover and its driving gear integral; but, for small freezers for household use, the attachment to the cylinder cover of a portion of the driving mechanism involves serious inconvenience in applying and detaching the several members of the freezer to introduce and withdraw the material to be operated upon. By reference to the drawings it will be seen that my improvement provides a construction whereby the entire freezing cylinder and its cover may be made of sheet metal in the ordinary manner and the driving mechanism may be lightly and cheaply made; while the whole apparatus possesses greater convenience of manipulation, durability and cheapness of manufacture than others now in use.

Having thus set forth the invention, what I claim herein, and desire to secure by Letters Patent, is—

The combination, with the ice receptacle $a$, the freezing cylinder $c$ having its cover $d$ locked from rotation thereon, and the agitator $r$ and scraper $s$, of the removable frame $f$ carrying the crank shaft $g$ having the gear $m$ upon its inner end and the spindle $l$ with fixed gear $n$ and loose gear $o$ meshing with the gear $m$, the cylinder cover $d$ being coupled detachably to the gear $o$ by means of an angular boss upon one of such members fitted to a socket upon the other member, the scraper being coupled to the gear $n$ by means of the spindle $l$, and the agitator being rotated with and by means of the cylinder $c$, as and for the purpose set forth.

In testimony whereof I have hereunto set my hand in the presence of two subscribing witnesses.

WILLIAM S. ROLSTON.

Witnesses:
MORRIS REED,
HENRY J. MILLER.